United States Patent [19]

Nurse, Jr.

[11] Patent Number: 5,580,453

[45] Date of Patent: Dec. 3, 1996

[54] FILTER APPARATUS FOR WASTE WATER DISCHARGE SYSTEM

[76] Inventor: Harry L. Nurse, Jr., 10409 Watterson Trail, Louisville, Ky. 40299

[21] Appl. No.: 514,232

[22] Filed: Aug. 11, 1995

[51] Int. Cl.$^6$ .................................................. B01D 29/35
[52] U.S. Cl. ...................... 210/323.2; 210/346; 210/437; 210/442; 210/451; 210/457
[58] Field of Search .................................. 210/314, 316, 210/323.2, 346, 437, 441, 442, 446, 448, 451, 457, 497.01, 532.1, 532.2

[56] References Cited

U.S. PATENT DOCUMENTS

| | | | |
|---|---|---|---|
| 2,765,084 | 10/1956 | Tursky | 210/323.2 |
| 2,900,084 | 8/1959 | Zabel . | |
| 2,934,209 | 4/1990 | Franck | 210/446 |
| 3,332,552 | 7/1967 | Zabel . | |
| 3,362,535 | 1/1968 | Kasten | 210/323.2 |
| 3,473,663 | 10/1969 | Winslow | 210/316 |
| 4,439,323 | 3/1984 | Ball . | |
| 4,710,295 | 12/1987 | Zabel . | |
| 5,382,357 | 1/1995 | Nurse . | |
| 5,492,635 | 2/1996 | Ball | 210/532.2 |

*Primary Examiner*—W. L. Walker
*Attorney, Agent, or Firm*—Middleton & Reutlinger; Charles G. Lamb

[57] ABSTRACT

A waste water filtering apparatus includes a vertically extending filter housing having a plurality of filter tubes disposed therein. At least one of the filter tubes has an opening in the bottom end thereof and is closed at the top wherein waste water to be filtered flows in through the interior of the filter tube and out through openings in the walls of the filter tube into the interior of the filter housing. A second filter tube is provided with a closed bottom end and an open outlet end in flow communication with a discharge outlet from the filter housing. The second filter tube is in spaced parallel relation with the first filter tube whereby water flowing in the interior of the housing flows into the second filter tube and flows upwardly and out of openings in the top end of the filter tube which is in flow communication with the outlet discharge of the filter.

26 Claims, 6 Drawing Sheets

FILTER APPARATUS FOR WASTE WATER DISCHARGE SYSTEM

BACKGROUND OF THE INVENTION

This invention relates to improvements in the filtration system of waste water systems particularly in septic tanks and more particularly relates to an improved filtration apparatus for the removal of solids from waste water which is relatively inexpensive and economical to clean and maintain.

In the use of tanks in a sewage treatment system, raw sewage flows into the tank wherein the solids separate from the liquid waste water and bio-degrade and the liquid passes out of the tank through laterals into a field wherein the liquid waste water from the septic tank is absorbed in the ground soil. Without the use of a filtration device within the tank, some of the solid particulates remain in the waste water and thereby flow out of the septic tank into the drain or leach fields. Thus, over time, a considerable amount of sludge and scum will pass out of the septic tank outlets and into the laterals where they are subsequently deposited in the leach fields. Thus, the leach fields become clogged and the waste water does not properly drain through the fields as intended. And, the ultimate result is that the fields must be dug up and replaced with gravel or the like for better dispersion of the waste water.

It has been common in recent years to place filtering apparatuses within the waste water discharge from waste water treatment tanks, such as septic tanks, wherein the filtration devices are disposed within the tanks just upstream of the waste water discharge from these tanks to remove some of these particulate materials. However, many of these filtering devices have been unsuccessful because the filters quickly become clogged by the solids present in the waste water and therefore added expense has been necessary to clean these clogged filters.

SUMMARY OF THE INVENTION

In the present invention, a filter housing is provided having an opening in the bottom thereof to receive waste water therein and an outlet in the top thereof for the passage of filtered waste water therefrom. The housing is provided with at least one porous tube having an opening in the bottom and a closed top and, at least one second porous filter tube having a closed bottom and an open top wherein the open top is in flow communication with a waste water discharge outlet, the first and second porous tubes being in spaced, vertical parallel alignment. The bottom of the housing is also closed with the exception of openings in flow-through communication with the opening into the first filter tube. Thus, waste water flows into the housing upwardly through the interior of the first filter tube passing outwardly through filter openings in the walls thereof and then into the second filter tube through the filter openings in the walls of the second filter tube. From the interior of the second filter tube, the filtered waste water rises upwardly and is discharged out through the waste water discharge outlet from the filter housing.

Thus, it is an object of the present invention to provide a filtering apparatus for waste water discharge which is economical to manufacture and efficient in removing of solids from waste water.

It is a further object of the present invention to provide a filtering apparatus for waste water which is not easily clogged.

It is even a further object of the present invention to provide a filtering apparatus for waste water which includes a plurality of filtering elements therein.

It is also an object of the present invention to provide a filtering apparatus for a septic tank which can include filter elements therein which can be easily removed and cleaned.

More particularly, the present invention provides for a waste water filter comprising: a vertically extending housing having a horizontally extending bottom plate member in a lower portion thereof and a horizontally extending top plate member in an upper portion thereof, said top plate member having a centrally disposed opening therein of preselected size; said housing having a bottom inlet and a top outlet, said outlet disposed vertically above said top member and in flow-through communication with said centrally disposed opening; at least one first vertically extending flow-through filter tube having an opening in a bottom end of said first filter tube in flow communication with said housing inlet; and, a second vertically extending filter tube having an open top and a closed bottom, said open top being co-extensive with said centrally disposed opening of said top plate member, said second vertically extending filter tube being spaced from said first filter tube.

Further objects, features and advantages of the present invention will be more readily understood by those skilled in the art upon the understanding of the following detailed description of the preferred embodiments taken in conjunction with the accompanying drawings.

BRIEF DESCRIPTION OF THE DRAWINGS

FIG. 6 is an enlarged perspective view of one open plug for insertion into one end of the filter tubes of FIG. 4 and 4a;

DETAILED DESCRIPTION OF THE PREFERRED EMBODIMENTS

Figure 1:
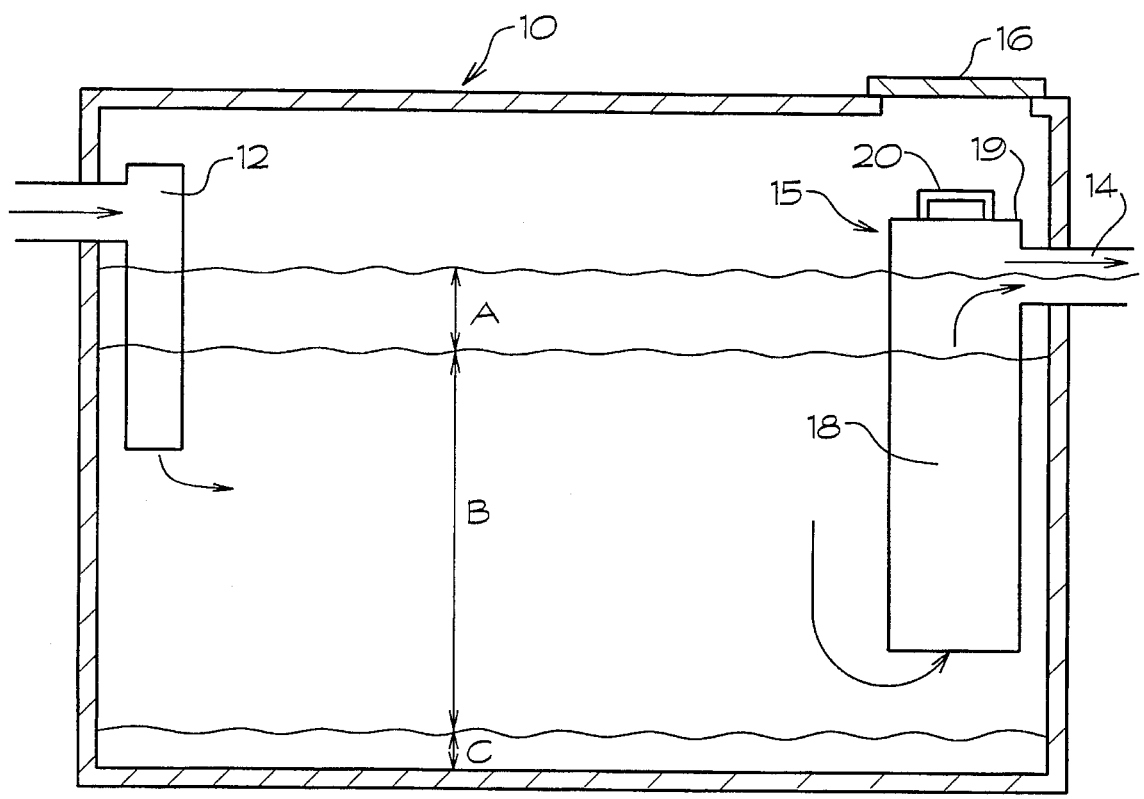
FIG. 1 is a sectional view of a septic tank with a filtering apparatus of the present invention.

FIG. 1 shows a septic tank 10 with a filter apparatus 15 of the present invention installed therein. The septic tank 10 is provided with a waste water inlet. 12 which is of T-shaped cross section with the outlet from the T-shaped inlet 12 being directed downwardly into the septic tank 10. The filtering apparatus 15 is generally comprised of a cylindrically housing 18 having an open inlet at the bottom of the housing, a removable top 19 and a horizontally extending discharge outlet 14 which extends either through the wall of the septic tank 10 or is in flow communication with a discharge outlet from the filter tank 10. The septic tank 10 is generally constructed so that the inlet 12 is spaced vertically above the outlet 14 so as to prevent the back-up of waste water from the septic tank out through the inlet 12.

Also, in a septic tank there are generally three levels of waste water. The first level, identified in FIG. 1 by the letter "A", is generally "scum" which includes a lot of the light weight particulates that float on top of the waste water; clear effluent, which is the middle layer and identified by the letter "B", makes up the largest portion of the waste water to be treated; and the lower level, identified by the letter "C", includes all of the larger particles which have settled from the waste water onto the bottom of the septic tank for further digestion and degrading. The location of the filter cartridge 15 in the septic tank is set so that the inlet filter apparatus is within the relatively clear waste water portion "B" of the waste water to be treated.

Figure 2:
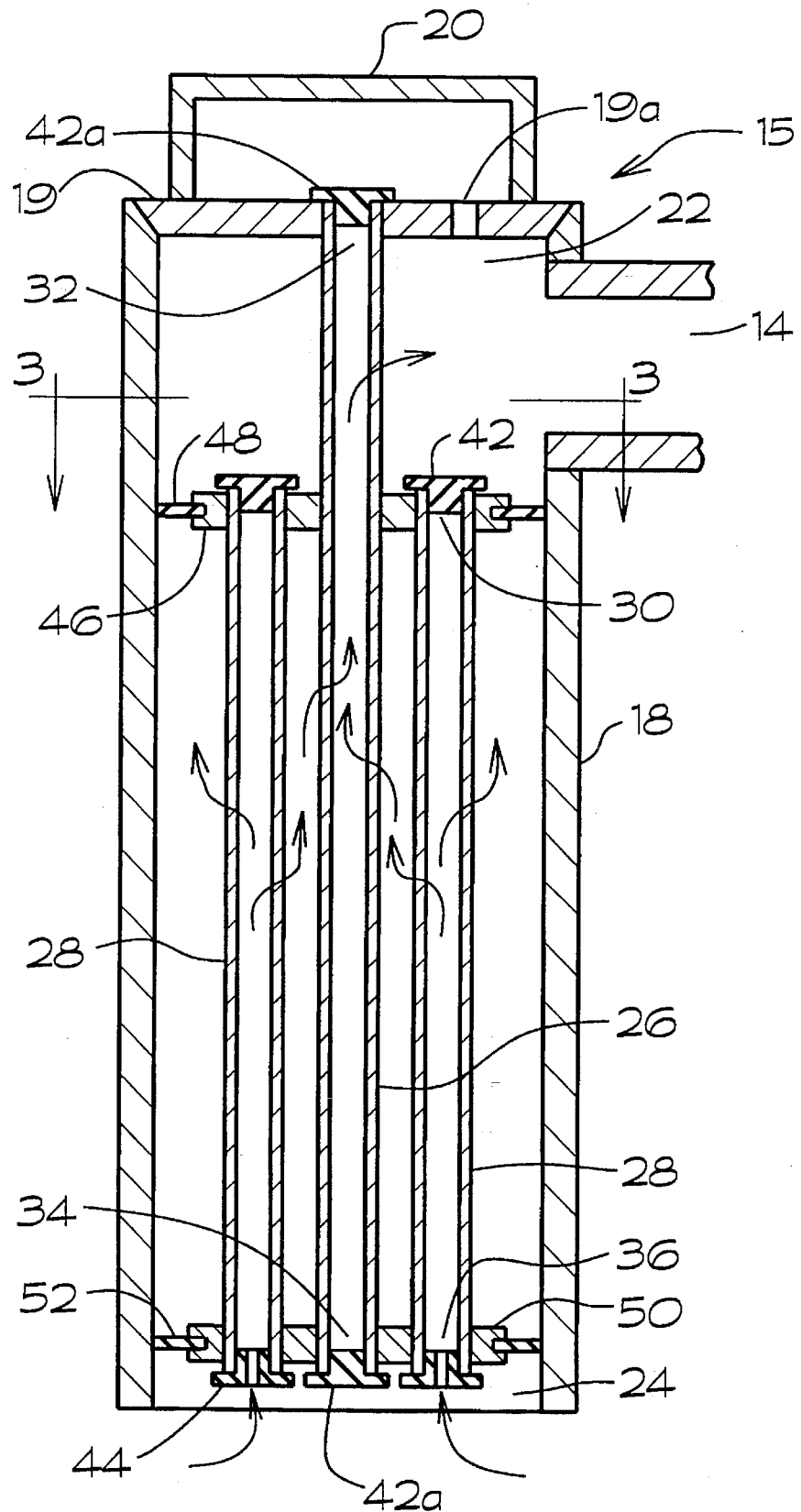
FIG. 2 is a sectional view of one preferred filter apparatus of the present invention.
Figure 3:
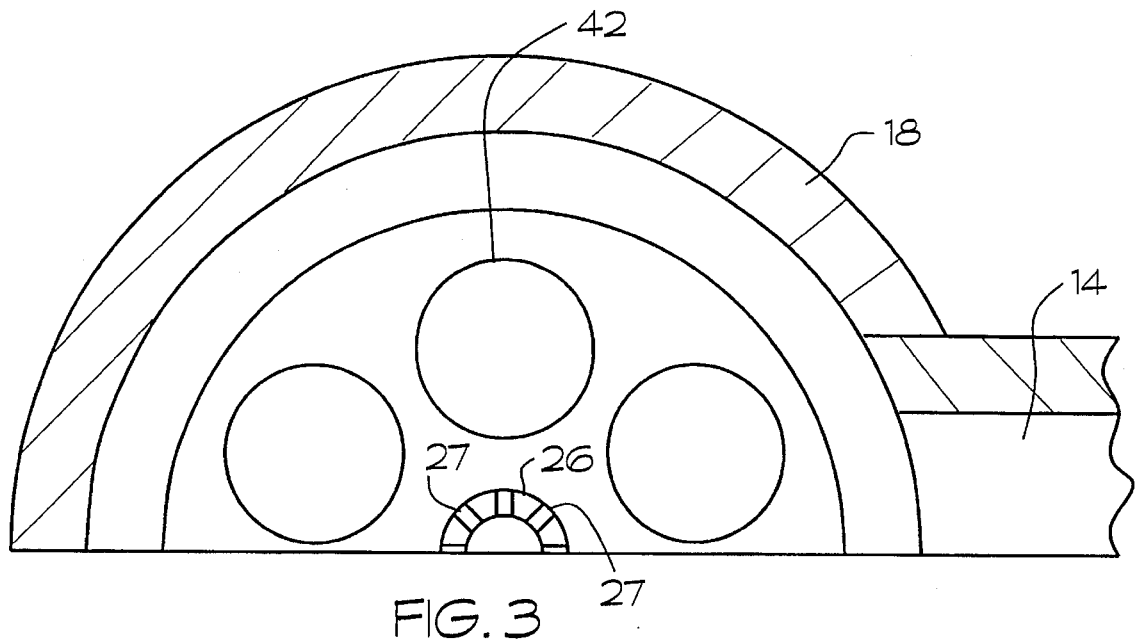
FIG. 3 is a fragmentary enlarged sectional top view of the embodiment shown in FIG. 2 taken along line 3—3.
Figure 4:
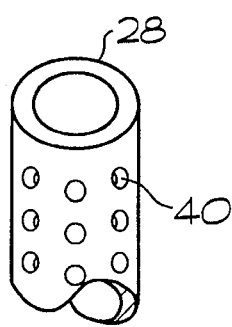
FIG. 4 is a perspective view of one preferred first filter tube of the present invention.
Figure 4A:
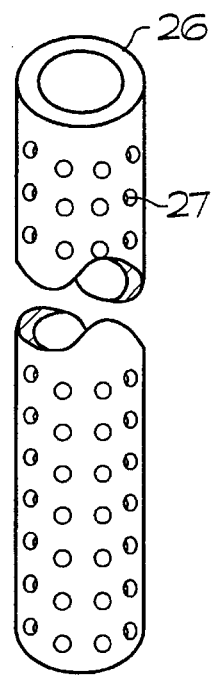
FIG. 4A is a perspective view of one preferred second filter tube of the present invention.
Figure 5:
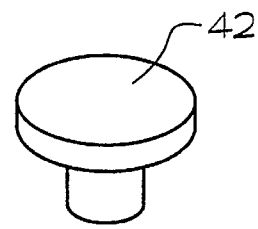
FIG. 5 is an enlarged perspective view of one closed plug for insertion in one end of the filter tubes of FIGS. 4 and 4A.
Figure 6:
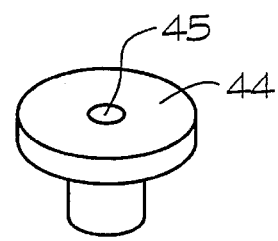

As best shown in FIG. 2, the filter apparatus 15 of the present invention houses a plurality of first filter tubes 28 therein which extend vertically in spaced parallel relation from the bottom opening 24 toward the top opening 22 of the filter housing 18. The plurality of longitudinally extending filter tubes 28 are spaced from and circumscribe a centrally disposed second filter tube 26 which is also longitudinally extending from the bottom opening 24 of the housing 18 towards the top opening 22. Each of the filter tubes 28 is provided with flow-through openings 40 (FIG. 4) in the vertically extending walls and the centrally disposed filtering tube 26 is also provided with a plurality of flow-through openings 27 of preselected cross section distributed along the length of the filter tube 26. In the preferred embodiment, the housing 18 may be standard sized commercially available plastic pipe with openings in each end thereof such as 4", 6", or 8" I.D. PVC pipe. As shown in FIG. 2, flow-through opening 36 in the filter tube 28 is provided with an open plug 44 having a flow-through opening 45 therein (FIG. 6) and the opposed opening 30 receives a plug 42 (FIG. 5) to seal off the upper end of the tube 28. The centrally disposed filter tube 26 is provided with plugs 42a, which are similar in construction to plug 42, in each open end 32 and 34 thereof to close off the flow of fluids through the ends of the filter tube 26.

As shown in FIG. 2, a horizontally extending bottom plate member or disc 50 is provided with a flexible gasket material 52 spaced between the outer periphery of the disc 50 and the inner walls of the housing 18 thereby providing a seal between the disc 50 and the inner wall of the housing 18. Disc 50 is provided with openings therein in flow communication with the openings 36 in tubes 28. Thus, the only flow of liquid into the housing 18 is through the opening 42 in the plug 44 in each of the filter tubes 28. It is realized, however, that openings 36 may not include plug 44, if so desired. In the top portion of the housing 18, but vertically below the outlet 14, is a horizontally extending top plate member or disc 46 which is also provided with a flexible gasket or sealing member 48 which is disposed between the disc 46 and the inner wall of the housing 18 to prevent the flow of waste water out of the housing except through the openings along the length of the centrally disposed filter tube 26.

The housing 18 has an opening in the top thereof to receive a removable cover 19. Removable cover 19 is generally provided with a beveled outer edge to fit or mate with a mating beveled interior edge around the top portion of the housing 18 for easy removal of the cover 19 thereby providing access for removal and replacement of filter tubes 26 and 28 therefrom. The cover 19 is also provided with an overflow or vent opening 19a which allows the venting or the overflow of waste water back into the tank 10 if the outlet 14 becomes plugged or overflows. A handle 20 is also provided to facilitate the removal of the cover 19.

As shown in FIG. 2, the filter tubes 26 and 28 are shown as being of approximately the same diameter. However, it is realized that in practice the centrally disposed tube 26 may be the same size as each of the filter tubes 28 or in many cases, may be larger as the centrally disposed filter tube has to receive all of the waste water that is flowing upwardly through a plurality of filter tubes 28. Moreover, the openings 27 in the filter tube 26 are generally smaller in cross section than the openings in the filter tubes 28 so as to provide for dual filtration of the effluent as it moves upward through the filter housing 18. In one preferred embodiment, for example, the flow-through openings 40 in tube 28 will be approximately ⅛" in diameter whereas the flow-through openings 27 in the filter tube 26 will be approximately 3/32" in diameter. However, the filter tube 26 may have a substantially greater number of flow-through openings 27 than the number of flow-through openings 40 in the filter tubes 28 thereby providing substantially greater overall flow-through cross-sectional area of flow in the tube 26 than the tubes 28.

Figure 7:
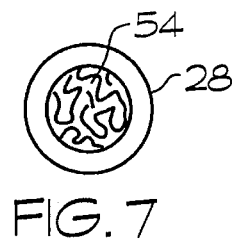
FIG. 7 is a top view of one filter tube of FIG. 4 including a showing of additional filtering media therein.

As shown in FIG. 7, in order to even further improve the filtration efficiency of the filter apparatus, fibrous filtering material 54 maybe placed within the filter tube 28 wherein the fibrous filter material will even filter out those particles which would pass through an ⅛" opening, such as an opening 40.

Figure 10:
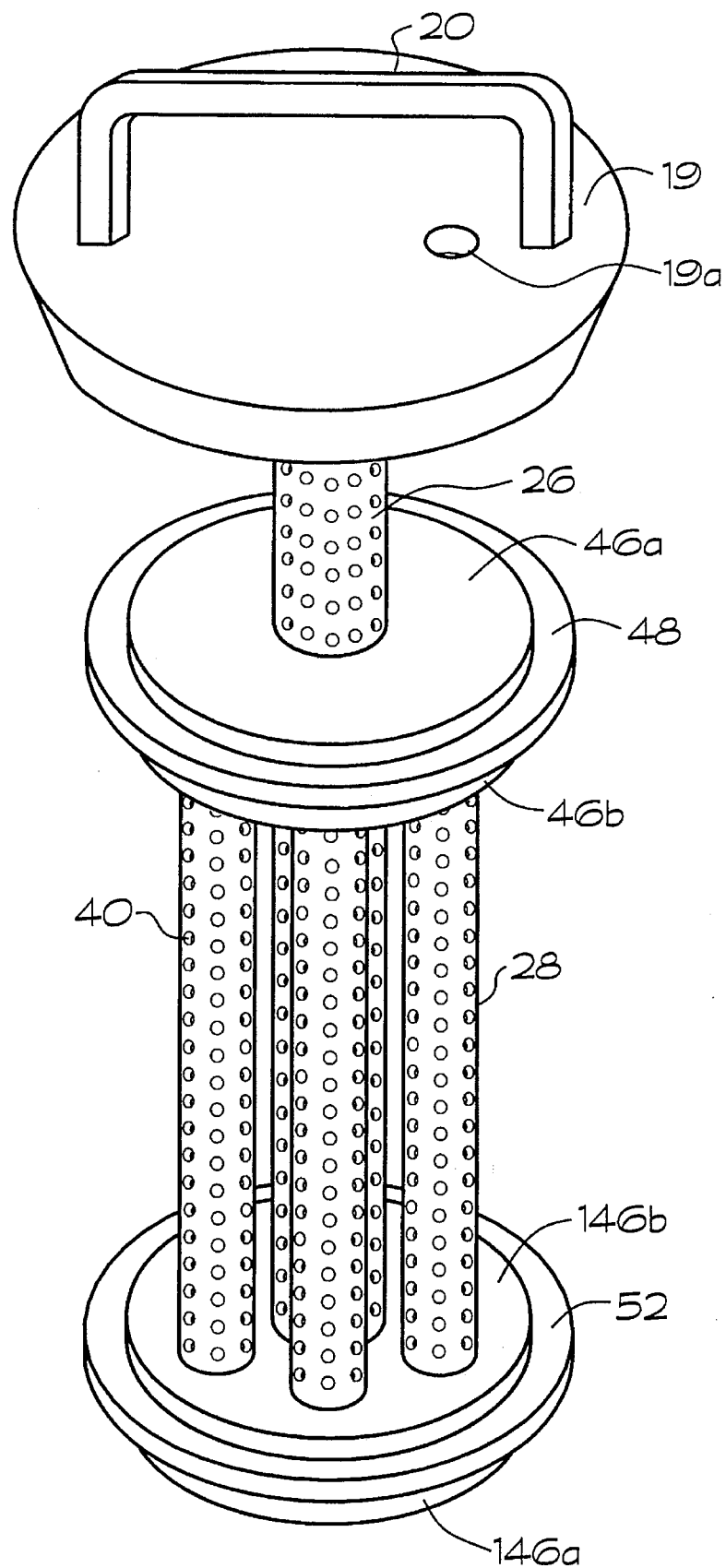
FIG. 10 is a perspective view of the filtering cartridges of a preferred embodiment.
Figure 11:
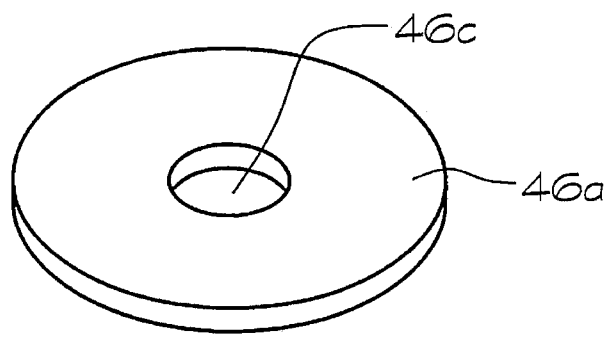
FIG. 11 is a perspective view of one element of the preferred embodiment of FIG. 10.
Figure 12:
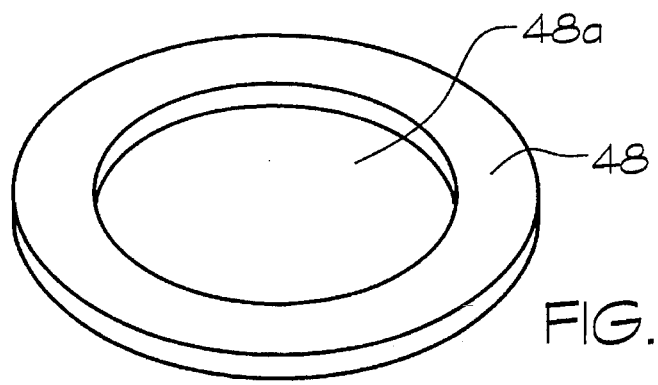
FIG. 12 is a perspective view of another element of FIG. 10.
Figure 13:
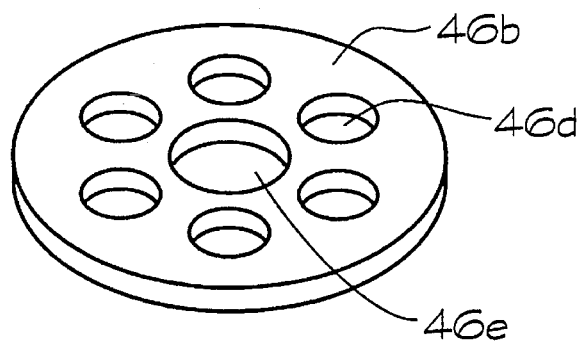
FIG. 13 is a perspective view of even another element shown in FIG. 10.
Figure 14:
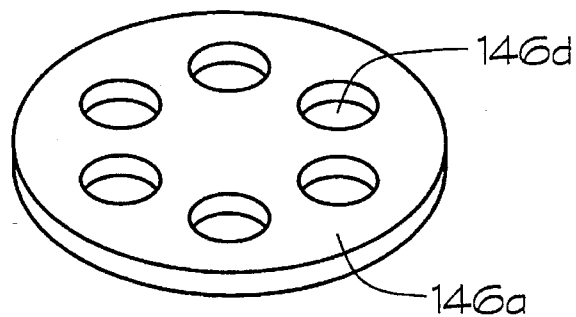
FIG. 14 is a perspective view of even another element shown in FIG. 10.

Referring now to FIG. 10, FIG. 10 shows a preferred arrangement of the filter elements of the present invention wherein the top plate member 46 is provided in two sections, an upper top tube receiving plate section 46a and a lower top tube receiving plate section 46b. Sandwiched between the plate sections 46a and 46b is an O-ring or gasket 48 (FIG. 12) having an opening 48a therethrough. The upper tube receiving plate section 46a is provided with an opening 46c (FIG. 11) for receiving the filter tube 26 therethrough. The lower top tube receiving plate section 46b is provided with a plurality of openings 46b (FIG. 13) for receiving the filter tubes 28 therethrough and a central opening 46e (FIG. 13) for receiving the filter tube 26 therethrough. The lower portion of the filter elements 26 and 28 are received by the bottom tube receiving plate member which is in two sections identifiable as the upper bottom tube receiving plate section 146b and the lower bottom tube receiving plate section 146a with an "O-ring" or gasket 52 being sandwiched therebetween, gasket 52 acting as a seal between the two element plate sections 146a, 146b, and the inner periphery of the housing 18. The upper bottom tube receiving plate section 146b is identical to the lower top tube receiving plate section or disc 46b. The lower bottom tube receiving plate section 146a is provided with openings 146d (FIG. 14) for receiving filter tubes 28 therethrough, but closed to the opening in the lower end of tube 26. Gasket 52 is also identical with and interchangeable with the gasket 48. The complete arrangement as shown in FIG. 10 including all of the elements contained in the housing 18 are easily removable for cleaning and replacing.

In operation, waste water flows from the septic tank 10 into the bottom openings 36 in the filter tubes 28 then upwards therethrough and out of the tubes 28 through the openings 40 and into the interior of the housing 18. The waste water in the housing 18 then continues its upward flow and then through the openings 27 in the centrally disposed filter tube 26 into the interior of tube 26. Waste water continues passing upwardly beyond the disc 46 and then back through openings 27 into the outlet chamber portion 22 then when the waste water passes from the interior of the tube 26 out through the openings 27 and into the chamber 22 the waste water is then in flow communication with the discharge outlet 14.

Figure 8:
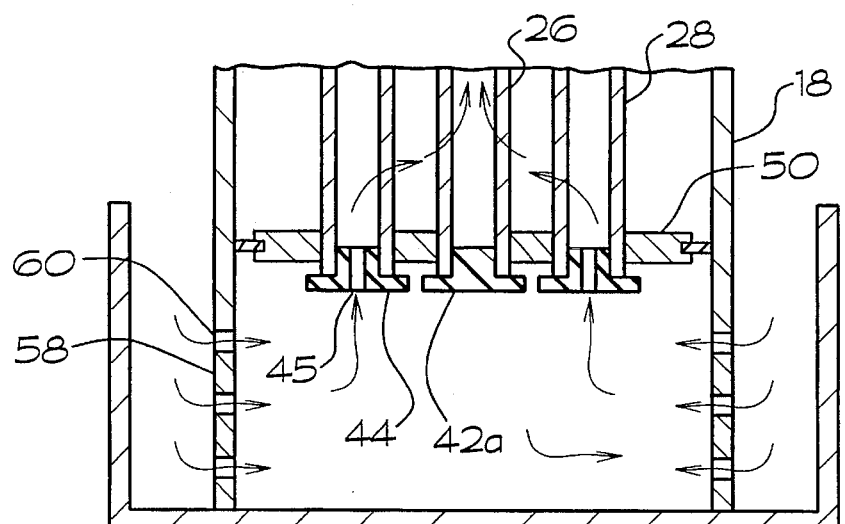
FIG. 8 is a sectional view showing one alternative flowthrough inlet into the filter housing of the present invention; and, FIG. 9 is a perspective view with selected portions in cutaway of the embodiment of FIG. 8.
Figure 9:
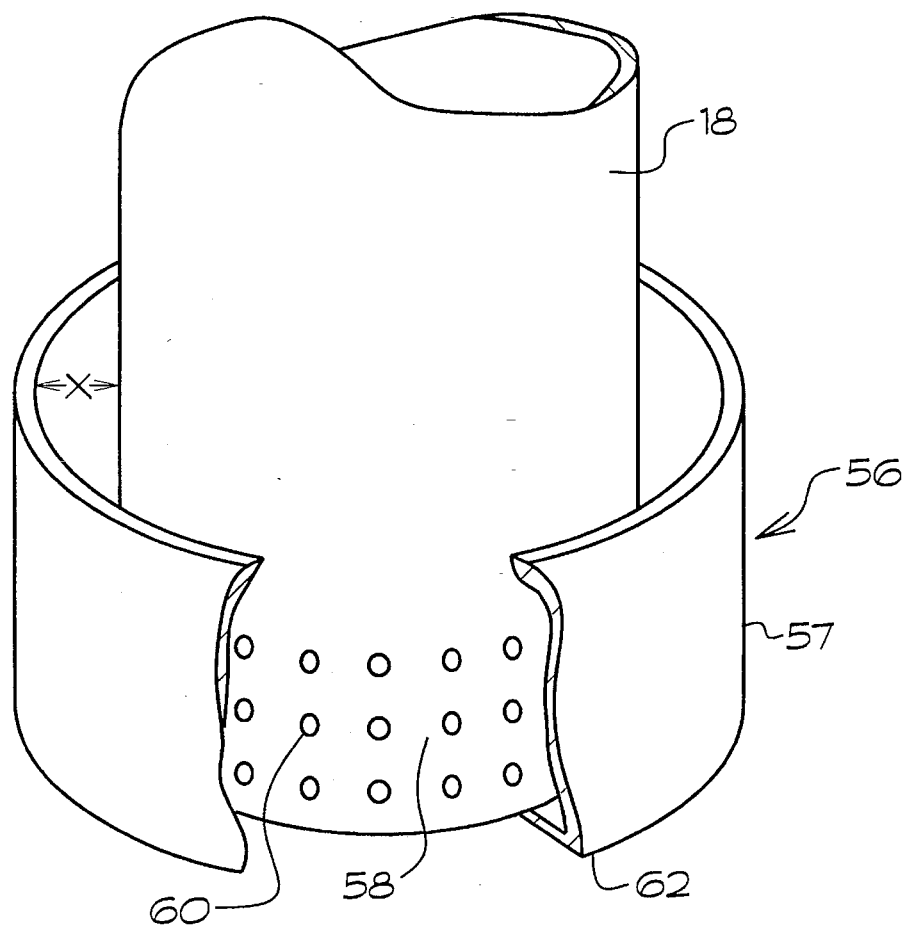

Now turning to FIGS. 8 and 9, an alternative to the preferred embodiment is shown wherein an additional filtration step is accomplished by closing off the bottom of the housing 18 with a horizontally extending impervious plate member 62. In this embodiment, the lower portion 58 of the filter housing 18 is provided with flow-through openings 60 therethrough wherein the size of the openings 60 are of a preselected size generally greater than the openings 45 into the filter tubes 28.

In FIG. 9 is shown a further alteration of the inlet to the housing 18 as shown in FIG. 8. In FIG. 9, plate member 62 has been extended outwardly a preselected distance from the exterior of the housing 18 and upwardly extending sidewalls 57 have been provided to define an outer chamber 56 through which the waste water must flow prior to inlet into the filter housing 18. In this particular embodiment, the distance between the exterior of the housing 18 and the side walls 57 is denoted by the letter "X". The distance "X" is generally greater than the diameter of the openings 60 in the lower portion of the housing 18. For example, in a filtering apparatus of FIG. 1, the distance "X" may be, for example, ½" in diameter and the opening 60 may be ⅜", the openings 40 in the tubes 28 may be ⅛", and the diameter of the openings 27 may be 3/32". Thus, this provides for a plurality of filtration steps for a filtering apparatus of the present invention thereby improving the efficiency of filtration in a relatively simple and inexpensive filtration device.

It is realized that various modifications may be made to the aforedescribed embodiments of the present invention without departing from the scope and spirit intended. Therefore, such modifications are intended to be included and incorporated within the claims appended hereto.

What is claimed is:

1. A waste water filter comprising:
   a vertically extending housing having a horizontally extending bottom plate member in a lower portion thereof with a plurality of openings therethrough and a horizontally extending top plate member in an upper portion thereof with a centrally disposed opening of preselected size in said top plate member;
   said housing having a bottom inlet and a top outlet, said bottom inlet being in flow communication with said openings in said bottom plate member, said outlet disposed vertically above said top plate member and in flow communication with said centrally disposed opening;
   a plurality of first vertically extending filter tubes having an opening in a bottom end of each of said first filter tubes, each bottom end being in flow communication with an opening in said bottom plate member; and,
   a second vertically extending filter tube centrally disposed within said housing and spaced from said first filter tube, said second filter tube having an open top and a closed bottom, said open top being co-extensive with said centrally disposed opening.

2. The filter of claim 1 having an outer chamber attached to a lower portion of said filter housing, said chamber having vertically extending sidewalls spaced from and circumferentially surrounding said lower portion, said chamber having a closed bottom spaced from said bottom member of said housing.

3. The filter of claim 2, said chamber having an inlet portion in flow communication with said housing with a filtering partition disposed within said chamber defining a waste water inlet compartment on one side of said filter partition and a waste water outlet compartment on an opposite side of said filter partition.

4. The filter of claim 3, said filtering partition having openings therein greater in diameter than the diameter of said bottom opening in said first filter tubes.

5. The filter of claim 1, said first filter tubes having centrally disposed openings in opposed ends thereof.

6. The filter of claim 5 including an open plug member in one end of said first filter tubes and a closed plug member in said opposite end.

7. The filter of claim 1, said first filter tubes spaced circumferentially of said second filter tube.

8. The filter of claim 1, said first filter tubes having flow-through openings in the walls along the length of said first filter tubes.

9. The filter of claim 1, said bottom end opening in said first filter tubes being centrally disposed.

10. The filter of claim 1, said first filter tubes having flow-through openings along the length of said first tubes, said second filter tube having flow-through openings along the length of said second tube, each flow-through opening in said first filter tubes being of preselected cross sectional area greater than the cross sectional area of each opening along the length of the second filter tube.

11. The filter of claim 1 including fibrous packaging filtering material disposed within the interior of at least one said first filter tubes.

12. The filter of claim 1, said horizontally extending bottom plate member comprising an upper bottom tube receiving plate section and a lower bottom tube receiving plate section, said upper bottom plate section being disposed vertically above said lower bottom plate section, said upper bottom plate section having openings therein to receive said first vertically extending filter tubes and said second vertically extending filter tube, said lower bottom plate section including openings therein to receive only said first vertically extending filter tubes therein.

13. The filter of claim 1, said horizontally extending top plate member comprising an upper top tube receiving plate section and a lower top tube receiving plate section, said upper top plate section being vertically above said lower top plate section, said upper top plate section having an opening therein to receive said second vertically extending filter tube, said lower plate section having openings therein to receive said first vertically extending tubes and said second vertically extending filter tube.

14. In combination with a septic tank, a waste water filter comprising:
- a vertically extending housing having a horizontally extending bottom plate member in a lower portion thereof with a plurality of openings therethrough and a horizontally extending top plate member with a centrally disposed opening of preselected size in said top plate member;
- said housing having a bottom inlet and a top outlet, said bottom inlet being in flow communication with said openings in said bottom plate member, said outlet disposed vertically above said top plate member and in flow communication with said centrally disposed opening;
- a plurality of first vertically extending filter tubes having an opening in a bottom end of each of said first filter tubes, each bottom end being in flow communication with said an opening in said bottom plate member; and
- a second vertically extending filter tube centrally disposed within said housing and spaced from said first filter tube, said second filter tube having an open top and a closed bottom, said open top being co-extensive with said centrally disposed opening.

15. The combination of claim 14 having an outer chamber attached to a lower portion of said filter housing, said chamber having vertically extending sidewalls spaced from and circumferentially surrounding said lower portion, said chamber having a closed bottom spaced from said bottom member of said housing.

16. The combination of claim 15, said chamber having an inlet portion in flow communication with said housing with a filtering partition disposed within said chamber defining a waste water inlet compartment on one side of said filter partition and a waste water outlet compartment on an opposite side of said filter partition.

17. The combination of claim 16, said filtering partition having openings therein greater in diameter than the diameter of said bottom opening in said first filter tubes.

18. The combination of claim 14, said first filter tubes having centrally disposed openings in opposed ends thereof.

19. The combination of claim 18 including an open plug member in one end of said first filter tubes and a closed plug member in said opposite end.

20. The combination of claim 14, said first filter tubes spaced circumferentially of said second filter tube.

21. The combination of claim 14, said first filter tubes having flow-through openings in the walls along the length of said first filter tubes.

22. The combination of claim 14, said bottom end opening in said first filter tubes being centrally disposed.

23. The combination of claim 14, said first filter tubes having flow-through openings along the length of said first tubes, said second filter tube having flow-through openings along the length of said second tube, each flow-through opening in said first filter tubes being of preselected cross sectional area greater than the cross sectional area of each opening along the length of the second filter tube.

24. The combination of claim 14 including fibrous packaging filtering material disposed within the interior of at least one of said first filter tubes.

25. The combination of claim 14, said horizontally extending bottom plate member comprising an upper bottom tube receiving plate section and a lower bottom tube receiving plate section, said upper bottom plate section being disposed vertically above said lower bottom plate section, said upper bottom plate section having openings therein to receive said first vertically extending filter tube and said second vertically extending filter tubes, said lower bottom plate section including openings therein to receive only said first vertically extending filter tubes therein.

26. The filter of claim 1, said horizontally extending top plate member comprising an upper top tube receiving plate section and a lower top tube receiving plate section, said upper top plate section being vertically above said lower top plate section, said upper top plate section having an opening therein to receive said second vertically extending filter tube, said lower plate section having openings therein to receive said first vertically extending tubes and said second vertically extending filter tube.

\* \* \* \* \*